(12) United States Patent
Wang

(10) Patent No.: US 7,639,466 B2
(45) Date of Patent: Dec. 29, 2009

(54) COMPUTER APPARATUS WITH OVER-VOLTAGE PROTECTION FUNCTION

(75) Inventor: Lei Wang, Kunshan (CN)

(73) Assignees: Micro-Star International Co., Ltd., Jumg-Ho (TW); MSI Electronic (Kun Shan) Co., Ltd., Kunshan (CN)

( * ) Notice: Subject to any disclaimer, the term of this patent is extended or adjusted under 35 U.S.C. 154(b) by 307 days.

(21) Appl. No.: 11/856,030

(22) Filed: Sep. 15, 2007

(65) Prior Publication Data
US 2008/0123236 A1     May 29, 2008

(30) Foreign Application Priority Data
Nov. 27, 2006   (TW)   .............................. 95220858 U

(51) Int. Cl.
*H02H 3/20* (2006.01)
(52) U.S. Cl. ..................................... 361/91.1
(58) Field of Classification Search ............... 361/18, 361/91.1
See application file for complete search history.

(56) References Cited

U.S. PATENT DOCUMENTS

| | | | | |
|---|---|---|---|---|
| 5,898,557 A * | 4/1999 | Baba et al. | ................... | 361/103 |
| 6,388,432 B2 * | 5/2002 | Uchida | ................... | 323/266 |
| 6,583,520 B2 * | 6/2003 | Shi et al. | ................... | 307/33 |
| 6,882,132 B2 * | 4/2005 | Haase | ................... | 323/283 |
| 6,894,882 B2 * | 5/2005 | Maru et al. | ................... | 361/91.1 |
| 7,003,421 B1 * | 2/2006 | Allen et al. | ................... | 702/117 |
| 7,294,993 B2 * | 11/2007 | Clavette et al. | ................... | 323/282 |
| 7,471,494 B2 * | 12/2008 | Ausserlechner | ................... | 361/90 |
| 2003/0030955 A1 * | 2/2003 | Yamamura et al. | ......... | 361/91.1 |
| 2005/0141158 A1 * | 6/2005 | Sae-Ueng et al. | ......... | 361/91.1 |
| 2006/0043947 A1 * | 3/2006 | Clavette et al. | ................. | 323/282 |
| 2006/0109039 A1 * | 5/2006 | Wu | ................................ | 327/172 |
| 2007/0014063 A1 * | 1/2007 | Sheng et al. | ................... | 361/91.1 |

FOREIGN PATENT DOCUMENTS

JP           05160490 A   *   6/1993

* cited by examiner

*Primary Examiner*—Ronald W Leja
*Assistant Examiner*—Christopher J Clark

(57) ABSTRACT

The present invention discloses a computer apparatus with over-voltage protection function, wherein the over-voltage protection device is electrically connected between the central processing unit (CPU) and the power supply to protect the CPU from damage under the condition of over-voltage failure. The over-voltage protection device comprises a first voltage comparison unit, a reference voltage unit, a second voltage comparison unit, a trigger unit, and a circuit switch unit; wherein, the first voltage comparison unit is used to compare the output voltage from the power supply with the default lower and upper voltage limits, and output a first potential signal; the reference voltage unit is used to output the reference voltage based on the first potential signal; the second voltage comparison unit is used to compare the core voltage of CPU with the reference voltage, and output a second potential signal when the core voltage of CPU is larger than the reference voltage; the trigger unit is used to accept the trigger of the second potential signal, and output a first trigger signal and a second trigger signal; and, the circuit switch unit is used to accept the trigger of the second trigger signal, and close the electrical connection between CPU and the power supply.

8 Claims, 2 Drawing Sheets

COMPUTER APPARATUS WITH OVER-VOLTAGE PROTECTION FUNCTION

FIELD OF THE INVENTION

The present invention relates to a computer apparatus with over-voltage protection function, and particularly for over-voltage protection on a central processing unit (CPU) in a computer apparatus to prevent the burn-down under the condition of over-voltage failure.

BACKGROUND OF THE INVENTION

In a conventional computer apparatus, the commonly used power supply method is based on the PWM (Pulse Width Modulation) method to reduce the input voltage, such as 5V or 12V, to the voltage required for each element, such as 1.05~1.825V or 1.3~3.5V). The main elements used in PWM circuit comprise a PWM chip, a MOSFET (Metal oxide semiconductor field effect transistor), an inductive coil, and a filter capacitor, etc. However, in the actual operating process of a computer apparatus, because the motherboard is conducting large current continuously, the elements on the motherboard will be easily heated. If these elements don't have very good heat sinks for heat dissipation, they would be burned down. In fact, in the operating process of motherboard in the prior art, MOSFET elements, particularly High-Side-MOS, would be easily burned down due to too high the temperature. At this time, although the motherboard would execute a self-protection function to shutdown, if the computer is rebooted, the voltage of CPU would be raised simultaneously with the voltage supplied by the power supply, i.e. 12V; finally, the CPU would be failed by over-voltage and resulting in too high voltage and burning down. Furthermore, each kind of protection functions for power supply would have larger time delay, and could not protect in time. For the prior art, there was no complete solution provided for the over-voltage protection of CPU, so there should be a lot of improvement possibilities.

SUMMARY OF THE INVENTION

The object of the present invention is to improve the defect of the conventional computer apparatus, so as to prevent the computer apparatus from burning down the internal CPU causing by too high voltage during the over-voltage failure.

To this end, the present invention provides a computer apparatus with over-voltage protection function, which comprises: a central process unit (CPU); a power supply, for at least supplying the power required for the CPU, and accepting the trigger by a first trigger signal to turn off the power supply; and, an over-voltage protection device, which is electrically connected between the CPU and the power supply, and is used to protect the CPU from damage under the condition of over-voltage failure. The over-voltage protection device comprises: a first voltage comparison unit, which is used to compare the output voltage from the power supply with the default lower voltage limit and the default upper voltage limit, and output a first potential signal; a reference voltage unit, which is used to output a reference voltage based on the first potential signal; a second voltage comparison unit, which is used to compare the core voltage of the CPU with the reference voltage, and output a second potential signal when the core voltage of the CPU is larger than the reference voltage; a trigger unit, which is used to accept the trigger of the second potential signal, and output a first trigger signal and a second trigger signal; and, a circuit switch unit, which is used to accept the trigger of the second trigger signal, and close the electrical connection between the CPU and the power supply.

BRIEF DESCRIPTION OF THE DRAWINGS

The present invention would be detailed described in the following to make the skilled in the art further understand the objects, features, and effects of the present invention with the embodiments and the attached figures wherein.

DETAILED DESCRIPTION OF THE INVENTION

Figure 1A:
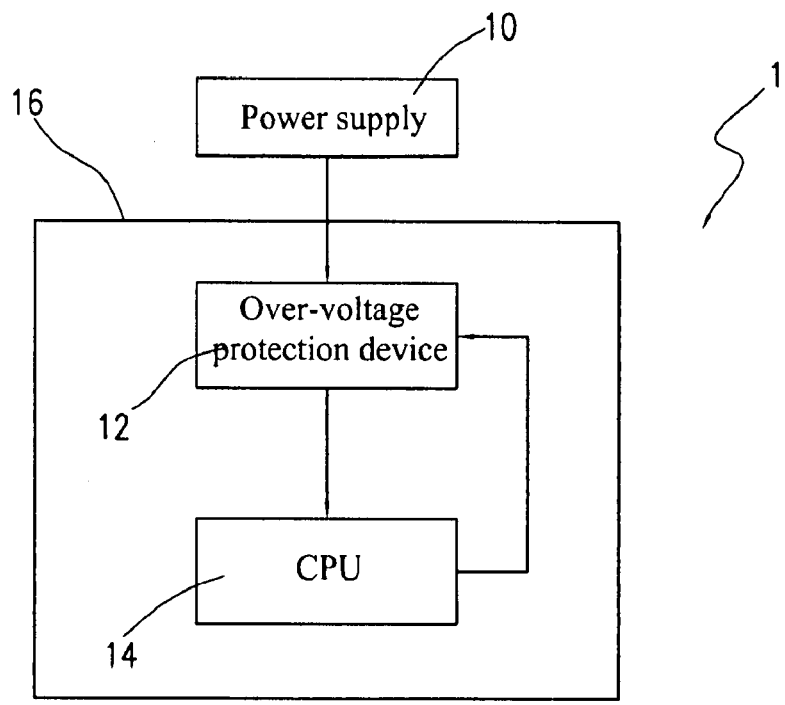
FIG. 1A is a block diagram of a preferred embodiment according to the present invention.
Figure 1B:
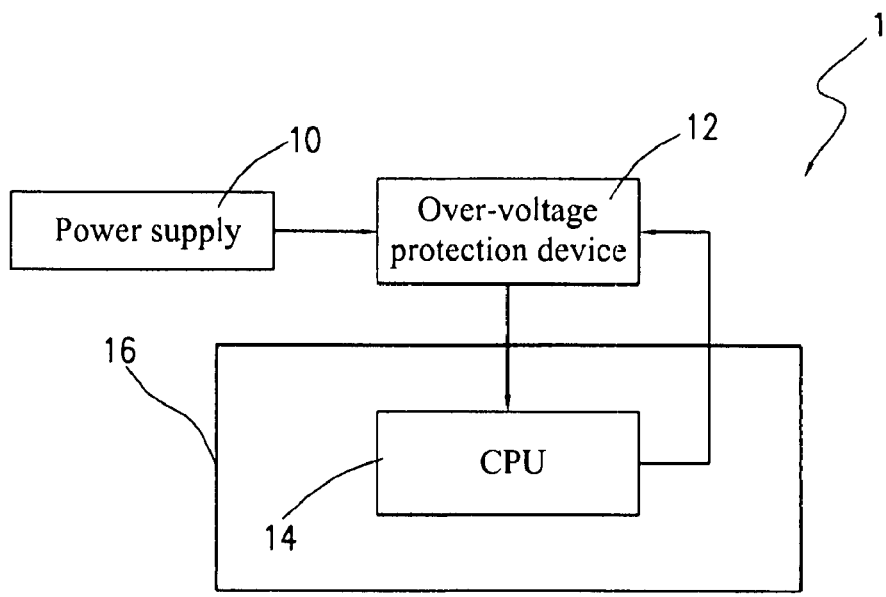
FIG. 1B is a block diagram of another preferred embodiment according to the present invention.

FIG. 1A is a block diagram of a preferred embodiment according to the present invention. FIG. 1B is a block diagram of another preferred embodiment according to the present invention. The computer apparatus with over-voltage protection function 1 according to the present invention comprises: a power supply 10, an over-voltage protection device 12, and a central processing unit (CPU) 14 on a motherboard 16. As shown in the figure, the power supply 10 is at least used to supply the power required by the CPU 14. The over-voltage protection device 12 is connected with the CPU 14 and the power supply 10 for protecting the CPU 14 from damage under the condition of over-voltage failure.

As shown in FIG. 1A and FIG. 1B, because the over-voltage protection device 12 is located between the power supply 10 and the CPU 14, when the computer apparatus 1 encounters the over-voltage failure, the over-voltage protection device 12 could first proceed the protection process before the damage of CPU 14, so as to prevent the CPU 14 from being influenced, which is one of the major spirit according to the present invention. Moreover, the reason why the over-voltage protection device 12 according to the present invention could proceed the over-voltage protection process in advance is due to the feedback circuit formed by both the over-voltage protection device 12 and the CPU 14, and the feedback circuit is also one of the important technical features in the present invention. The major difference between FIG. 1A and FIG. 1B is that the over-voltage protection device 12 in FIG. 1A is configured on the motherboard 16, and most of it employs chips or integrated circuits as the implementation aspect; and, the over-voltage protection device 12 in FIG. 1B is independent of the motherboard 16, and could be a standalone electronic device. Specifically speaking, the above-mentioned two preferred embodiments are only two of the embodiments according to the present invention, so that the skilled in the related art could make various equivalent changes.

Figure 2:
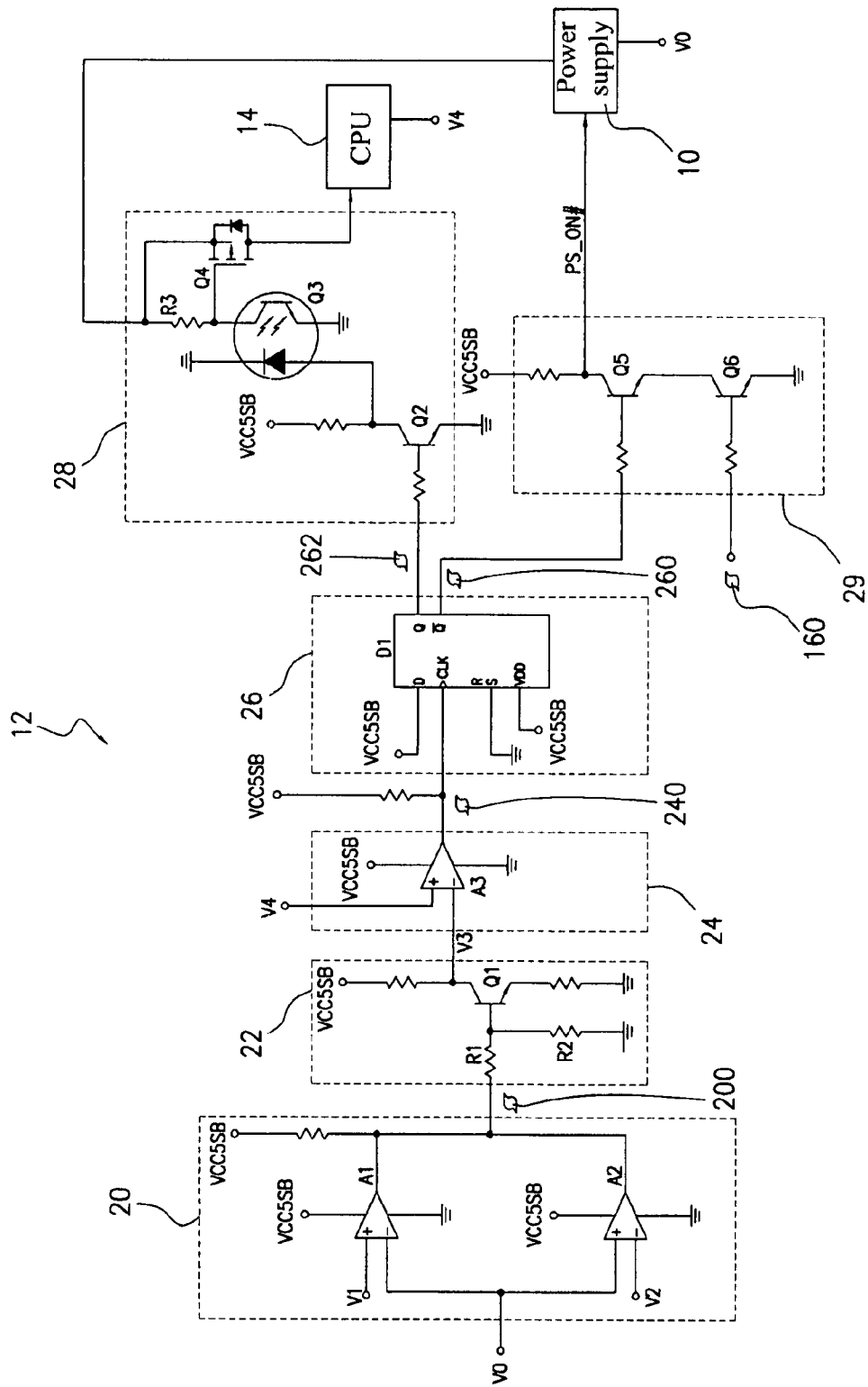
FIG. 2 is a detailed circuit diagram of the over-voltage protection device in FIG. 1A and FIG. 1B.

FIG. 2 is a detailed circuit diagram of the over-voltage protection device 12 in FIG. 1A and FIG. 1B. As shown in FIG. 2, the over-voltage protection device 12 comprises: a first voltage comparison unit 20, a reference voltage unit 22, a second voltage comparison unit 24, a trigger unit 26, and a circuit switch unit 28. The function and circuit for each unit will be detailed described as follows.

In FIG. 2, the symbol VCC5SB indicates the 5V Standby voltage, and the voltage source comes from the power supply 10.

The first voltage comparison unit 20 is used to compare the output voltage V0 from the power supply 10 with the default lower voltage limit V2 and the default upper voltage limit V1, and output a first potential signal 200. The first voltage comparison unit 20 mainly comprises: a first voltage comparator A1 and a second voltage comparator A2. The positive input of the first voltage comparator A1 is received with the upper voltage limit V1, and the output is connected to the input of the reference voltage unit 22. The positive input of the second voltage comparator A2 is connected to the negative input of the first voltage comparator A1 and the output V0 of the power supply 10, and the negative input of the second voltage comparator A2 is received with the lower voltage limit V2. In the actual application process of the present invention, the 12V supplied by the power supply 10 could be used as an embodiment for output voltage V0, and the upper voltage limit V1 could be predetermined at 5V, and the lower voltage limit V2 could be predetermined at 0.88V.

The reference voltage unit 22 is used to output a reference voltage V3 based on the first potential signal 200. The reference voltage unit 22 mainly comprises: a first BJT (Bipolar Junction Transistor) Q1, in which the base of the first BJT Q1 is a voltage splitting circuit composed of resistor R1 and resistor R2, and is connected to the output of the first voltage comparator A1 and the output of the second voltage comparator A2. Because a certain amount of time is required for the 12V voltage supplied by the power supply 10 rising from 0V to 12V, in the present invention, when the 12V voltage supplied by the power supply 10 is between the upper voltage limit V1 (5V) and the lower voltage limit V2 (0.88V), the transistor Q1 should be conducted. On the other hand, when the 12V voltage supplied by the power supply 10 is not between the upper voltage limit V1 (5V) and the lower voltage limit V2 (0.88V), the transistor Q1 would not be conducted. The reference voltage V3 could have two values according to the first potential signal 200 outputted from the first voltage comparison unit 20: when the first potential signal 200 is at high potential and the transistor Q1 is conducted, the reference voltage V3 is 1.32V; and, when the first potential signal 200 is at low potential and the transistor Q1 is not conducted, the reference voltage V3 is 5V.

The second voltage comparison unit 24 is used to compare the reference voltage V3 with the core voltage (Vcore) V4 used by CPU 14, and output a second potential signal 240 when the core voltage V4 of the CPU 14 is larger than the reference voltage V3. The actual means of the second voltage comparison unit 24 employs a third voltage comparator A3, and the negative input of the third voltage comparator A3 is connected to the collector of the first BJT Q1, and the positive input of the third voltage comparator A3 is received with the core voltage V4 of the CPU (14).

The trigger unit 26 is used to accept the trigger by the second potential signal 240, and output a first trigger signal 260 and a second trigger signal 262; wherein, the trigger unit 26 is a D-type trigger D1, and the clock control terminal (CLK) of the D-type trigger D1 is connected to the output of the third voltage comparator A3. The complementary output Q' of the D-type trigger D1 is connected to the ON/OFF control terminal (PS_ON#) of the power supply 10 through the transistor switch circuit 29 composed of BJT Q5 and Q6. Thus, the power supply 10 could accept the trigger by the first trigger signal 260, and turn off the power supply.

Furthermore, the base of BJT Q6 could accept the sleep signal 160 from the motherboard, thus whether to activate the ON/OFF control terminal (PS_ON#) could be determined by the first trigger signal 260 and the sleep signal 160.

The circuit switch unit 28 is used to accept the trigger by the second trigger signal 262 to turn off the connection between the CPU 14 and the power supply 10, so as to break down the power supply by the power supply 10 to the CPU 14. As shown in FIG. 2, the circuit switch unit 28 mainly comprises: a second BJT Q2, a photocoupler Q3, and a MOSFET Q4; wherein, the base of the second BJT Q2 is connected to the output Q of the D-type trigger D1; the input of the photocoupler Q3 is connected to the collector of the second BJT Q2, and the output of the photocoupler Q3 is connected to the output of the power supply 10 through the resistor R3; and, the gate of the MOSFET Q4 is connected to the output of the photocoupler Q3, and the source is connected to the output of the power supply 10, and the drain is connected to the power input of the CPU 14.

The beneficial effect of the present invention could be described as follows. The present invention could prevent the void welding of MOSFET components during the manufacturing process, or the burn-down of CPU caused by the damage of MOSFET components during testing in production line. Moreover, the present invention could prevent the damage of MOSFET caused by improper usage by the user, such as overclocking, and resulting in CPU burn-down. Furthermore, the computer apparatus according to the prevent invention even in a working environment with insufficient heat dissipation could effectively protect the CPU. And, if the computer apparatus is occurred with unexpected exceptional effect during operation, it could still respond in-time. The present invention could not only provide the above-mentioned effects, but also provide the advantages of simple implementation, reliable function, and lower cost.

The present invention has been disclosed with the embodiments as above. However, these disclosed embodiments are not used to limit the present invention. The skilled in the art could have various changes and modification to the embodiments without departing from the spirit and scope of the present invention, and the changes and modification should be all covered in the scope of the present invention. The patent protection scope for the present invention should be defined by the attached claims of the application.

What is claimed is:

1. A computer apparatus with over-voltage protection function, which comprises:
   a central processing unit (CPU);
   a power supply, which is used to supply the power required by the CPU, and accept the trigger by a first trigger signal to turn off the power supply;
   an over-voltage protection device, which is electrically connected between the CPU and the power supply to protect the CPU from damage under the condition of over-voltage failure, and includes:
   a first voltage comparison unit, which is used to compare the output voltage from the power supply with a default lower voltage limit and a default upper voltage, and output a first potential signal;
   a reference voltage unit, which is used to output a reference voltage based on the first potential signal;
   a second voltage comparison unit, which is used to compare the core voltage of the CPU with the reference voltage, and output a second potential signal when the core voltage of the CPU is larger than the reference voltage;
   a trigger unit, which is used to accept the trigger by the second potential signal, and output the first trigger signal and a second trigger signal;
   a circuit switch unit, which is used to accept the trigger by the second trigger signal, and turn off the electrical connection between the CPU and the power supply.

2. The computer apparatus according to claim 1, wherein the first voltage comparison unit comprises:

a first voltage comparator, in which the positive input of the first voltage comparator is received with the upper voltage limit, and the output is connected to the input of the reference voltage unit;

a second voltage comparator, in which the positive input of the second voltage comparator is connected to the negative input of the first voltage comparator and the output of the power supply, and the negative input is received with the lower voltage limit, and the output of the second voltage comparator is connected to the input of the reference voltage unit.

3. The computer apparatus according to claim 2, wherein the reference voltage unit comprises:

a first bipolar junction transistor (BJT), in which the base of the first BJT is connected to the output of the first voltage comparator and the output of the second voltage comparator through a voltage splitting circuit.

4. The computer apparatus according to claim 3, wherein the second voltage comparison unit is a third voltage comparator, and the negative input of the third voltage comparator is connected to the collector of the first BJT, and the positive input of the third voltage comparator is received with the core voltage of the CPU.

5. The computer apparatus according to claim 4, wherein the trigger unit is a D-type trigger, and the clock control terminal of the D-type trigger is connected to the output of the third voltage comparator, and the input of the D-type trigger is connected with a high potential.

6. The computer apparatus according to claim 5, wherein the circuit switch unit comprises:

a second bipolar junction transistor (BJT), in which the base of the second BJT is connected to the output of the D-type trigger;

a photocoupler, in which the input of the photocoupler is connected to the collector of the second BJT, and the output of the photocoupler is connected to the output of the power supply through a resistor; and, a metal oxide semiconductor field effect transistor (MOSFET), in which the gate of MOSFET is connected to the output of the photocoupler, and the source is connected to the output of the power supply, and the drain is connected to the power input of the CPU.

7. The computer apparatus according to claim 5, wherein the complementary of the D-type trigger is connected to the ON/OFF control terminal (PS_ON#) of the power supply through a transistor switch circuit.

8. The computer apparatus according to claim 7, wherein the transistor switch circuit is composed of a plurality of BJTs.

* * * * *